Dec. 5, 1939.  D. H. MILLS  2,182,484
AUTOMOBILE BUMPER ANTENNA SYSTEM AND MOUNTING
Filed May 14, 1938
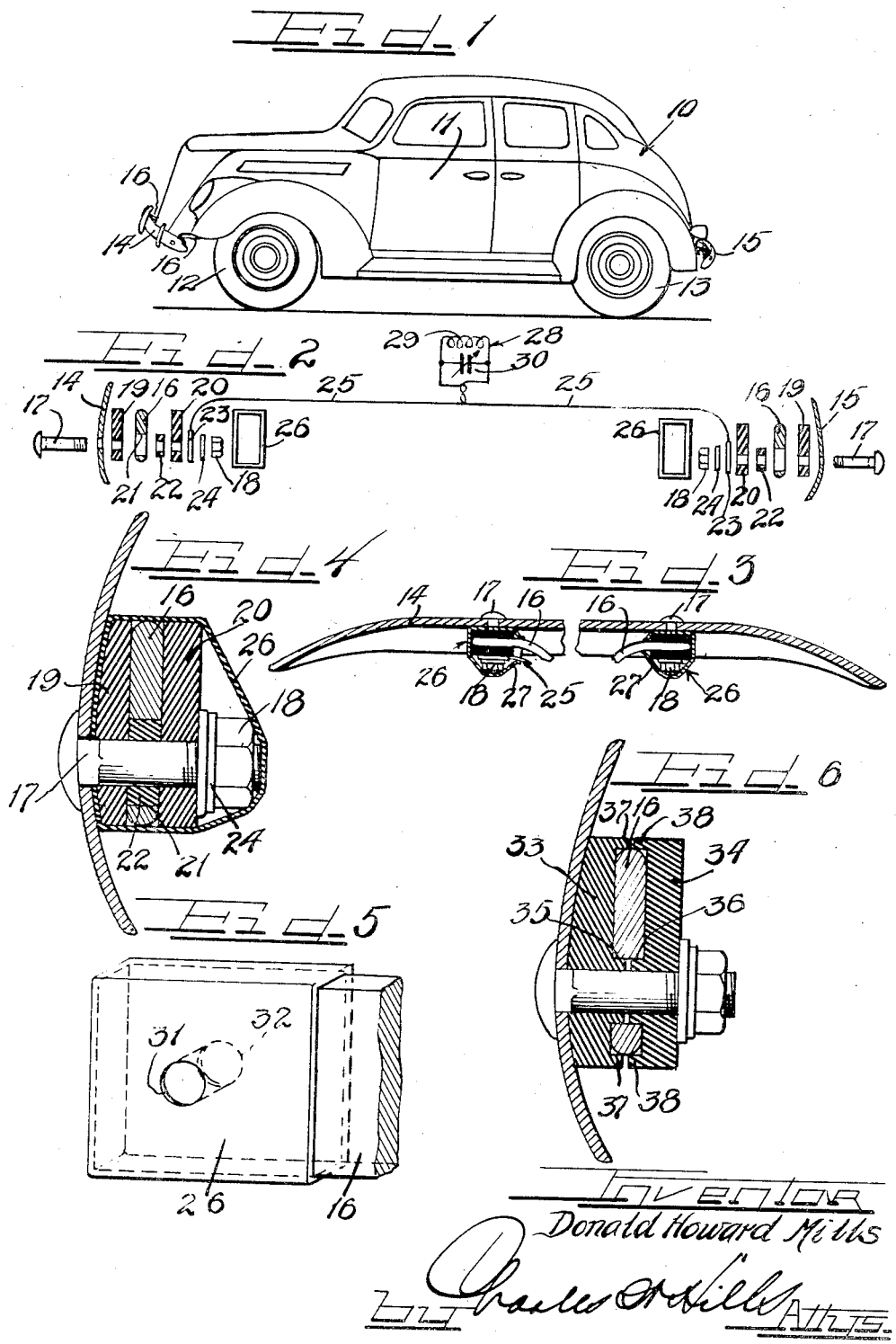
Inventor
Donald Howard Mills Patented Dec. 5, 1939

2,182,484

UNITED STATES PATENT OFFICE 2,182,484

AUTOMOBILE BUMPER ANTENNA SYSTEM AND MOUNTING

Donald Howard Mills, Detroit, Mich.

Application May 14, 1938, Serial No. 208,021

6 Claims. (Cl. 250—33)

This invention relates to an automobile bumper antenna system and novel mounting therefor and, more particularly, to an antenna system and mounting which employs one or both of the vehicle bumper bars as the antenna.

Considerable difficulty has been occasioned in the past in providing a satisfactory antenna system for the modern motor vehicle. For a number of years, it was common practice to provide an antenna in the roof or top of the automobile. With the advent of the modern steel top for automobiles, the disposition of an antenna within the top rapidly fell into disuse. Another system which found wide favor for a time was to mount the antenna below and in parallel spaced relationship to the running board of the automobile. Such disposition of the antenna obviously detracted from the general appearance of the automobile and has become more and more pronounced as the desire for streamlining of automobile bodies has increased. The one portion of the modern automobile which must remain spaced from the main body for obvious reasons, is the bumper bar or impact member. Some attempts have been made in the past to employ the bumper bar as an antenna, but to my knowledge these attempts have not met with any great degree of success, due to the particular antenna systems employed and to the mounting and means for insulating the same from the bumper bar.

It is an object of the present invention to provide a novel automobile bumper antenna system.

It is another object of the present invention to provide a novel mounting for bumper bars or impact members which permits their use as antenna members.

It is a further object of this invention to provide a novel means for insulating a vehicle bumper bar from its supporting hangers.

Another and still further object of this invention is to provide a novel mounting assembly of bumper bar and hanger which includes means for protecting the mounting from water and other deleterious road compounds.

Another and still further object of this invention is to electrically connect the front and rear bumper bars of a motor vehicle to form a novel antenna array.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawing, in which:

Figure 1 is an elevational view of a motor vehicle equipped with front and rear bumper bars electrically connected and mechanically mounted in accordance with the teachings of the present invention;

Figure 2 is a schematic view of the automobile bumper antenna system with the mounting and insulating means for the bumper bars exploded to illustrate the various component parts of the mounting;

Figure 3 is a top view of one of the bumper bars and mounting therefor;

Figure 4 is an enlarged cross-sectional view of the bumper bar mounting;

Figure 5 is an isometric view illustrating a modified form of my invention; and

Figure 6 is a cross-sectional elevational view similar to Figure 4 showing a different embodiment of my invention.

In Figure 1 of the drawing, an automobile 10 of conventional design is illustrated and includes in general a body 11, front and rear wheels 12 and 13 respectively, and front and rear bumpers bars 14 and 15, respectively. As will now be explained, bumper bars 14 and 15 are mounted on the vehicle in a novel manner, and are electrically connected to form an antenna system for radio apparatus (not shown) carried within the vehicle 10.

Referring now to Figures 2 to 4 of the drawing, each bumper bar 14 and 15 is mechanically connected to and supported from the vehicle 10 by means of a plurality of hangers 16. The hangers 16 are firmly fastened to the bumper bars 14 and 15 by bolts 17 and cooperating nuts 18.

In order to facilitate the description, reference will now be made to the front bumper bar mounting, but it is to be understood that the rear bumper bar 15 is mounted in a similar manner.

In order to insulate the bumper bar 14 and the mounting bolt 17 from the hanger 16, a pair of insulating blocks 19 and 20 are disposed on opposite sides of the hanger 16 and around the mounting bolt 17. These insulating blocks 19 and 20 are preferably formed of substantially rigid dielectric material having high physical strength. One form of insulating material which has been found highly satisfactory is a kraft paper impregnated with asphalt or other suitable bitumen or mineral pitch having high dielectric strength. By the term "kraft" paper is meant a paper made by the so-called sulfate process of cooking pulp wood, or any modification thereof wherein sodium sulfide is the active ingredient of the cooking liquor. Kraft paper has high physical strength and when impregnated with asphalt, has high dielectric strength. It has also been found to have a remarkable resistance to water absorption, an important consideration because of the proximity of the insulating blocks to the road surface. It has been found that insulators of this character have good impact resisting properties, particularly when they are made up of pressed paper blocks, and further have substantially no radio frequency current leakage such as occurs if rubber insulators are employed.

The hanger 16 is provided with a hole 21 therein which is considerably larger than the diameter of the bolt 17. A fiber washer 22 is placed around the bolt 17 within the hole 21 of the hanger 16. Between the inner insulating block 20 and the nuts 18 of the clamping bolt 17 are disposed two metal washers 23 and 24. The washer 23 at one end of the bumper bar 14 is arranged to have a lead in or transmission wire 25 soldered or otherwise electrically connected thereto.

To protect the mounting assembly from the effect of water or road compounds which might cause radio frequency leakage, a flexible rubber cap 26, closed at one end and open at the other, is arranged to be slipped over the end of the hanger 16 and over the insulating blocks 19 and 20 and the nut 18. One side of the cap 26 adjacent the bumper bar 14 is apertured to permit the passage of the clamping bolt 17 therethrough. It will, of course, be understood by those skilled in the art that the wall opposite the wall having the hole therein can be pulled far enough to one side to permit the washers 23 and 24 and the nut 18 to be applied to the end of the bolt and tightened up. The flexible wall of the cap 26 may then be allowed to slip back of the bolt and nut 27 (see Figure 3 of the drawing).

The rear bumper bar 15 is mounted in the same manner as the front bumper bar and similar reference numerals have been given to the corresponding parts of the rear bumper bar mounting.

The front and rear bumper bars 14 and 15 are electrically connected to the input circuit 28 of the radio apparatus as is diagrammatically illustrated in Figure 2. For simplicity this input circuit 28 has been conventionally illustrated as a tuned circuit which includes an inductance coil 29 and a variable condenser 30. It has been found that greatly improved reception is obtained when the front and rear bumpers 14 and 15 are connected as a doublet antenna. It has further been found that, unlike all previous automobile antenna systems, there is no substantial reduction of signal strength when the vehicle is passing through a culvert, underpass or the like or when the vehicle is in close proximity to high tension electric power lines.

In Figure 5 of the drawing, a modified form of flexible cap 26 is shown. More particularly, the modified form of flexible cap 26 shown in Figure 5 is arranged to slip over the end of the hanger 16, but is not arranged to extend around the insulators 19 and 20. For that reason, apertures 31 and 32 are provided on opposite sides of the cap to permit the insertion of the clamping bolt 17 therethrough. In this form of the invention, it will, of course, be understood that the insulators 19 and 20 are around the clamping bolt 17, as before, but in this case exteriorly to the flexible cap 26.

In Figure 6 of the drawing, a modified form of insulating block is shown which permits the elimination of the insulating washer 22. More specifically, two insulating blocks 33 and 34 are employed, each having extruded collars 35 and 36 which are arranged to extend into the aperture formed in the hanger 16. Outer flanges 37 and 38 are also extruded on the insulators 33 and 34 respectively for extending around the outer edges of the hanger 16. The flexible rubber cap may or may not be used as desired with this particular type of mounting, depending upon whether the extruded outer flanges 37 and 38 are of sufficient dimensions to substantially protect the assembly from water and road compounds.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. An electrically insulated bumper bar mounting comprising a bumper bar, a bumper bar hanger, supporting means securing said bumper bar to said hanger including means for electrically insulating said bumper bar from said hanger, and a water resisting flexible hood member extending over said supporting means and a portion of said hanger.

2. An electrically insulated bumper bar mounting comprising a bumper bar, a bumper bar hanger, supporting means securing said bumper bar to said hanger including means for electrically insulating said bumper bar from said hanger, and a water resisting flexible hood member extending over said supporting means and a portion of said hanger, said hood member being closed at one end.

3. A bumper bar mounting comprising a bumper bar, a bumper bar hanger, and an electric insulator disposed between said bumper bar and said hanger comprising a block of kraft paper impregnated with asphalt.

4. A bumper bar mounting comprising a bumper bar, a bumper bar hanger, a clamping and bumper bar supporting member extending between said bumper bar and said hanger and means for electrically insulating said bumper bar and said clamping member from said hanger including a block of kraft paper impregnated with asphalt, disposed between said bumper bar and said member and said hanger.

5. The combination comprising a bumper bar hanger, a bumper bar mounted on said hanger, and an impact resisting dielectric member disposed between said bumper bar and said hanger to transmit impacts received by said bumper bar to said hanger and also to electrically insulate said bumper bar from said hanger, said member comprising a kraft paper impregnated with asphalt.

6. The combination comprising a bumper bar hanger, a bumper bar mounted on said hanger, and an impact resisting dielectric member disposed between said bumper bar and said hanger to transmit impacts received by said bumper bar to said hanger and also to electrically insulate said bumper bar from said hanger, said member comprising a strong, tough, unbleached paper impregnated with a bitumen.

DONALD HOWARD MILLS.